UNITED STATES PATENT OFFICE.

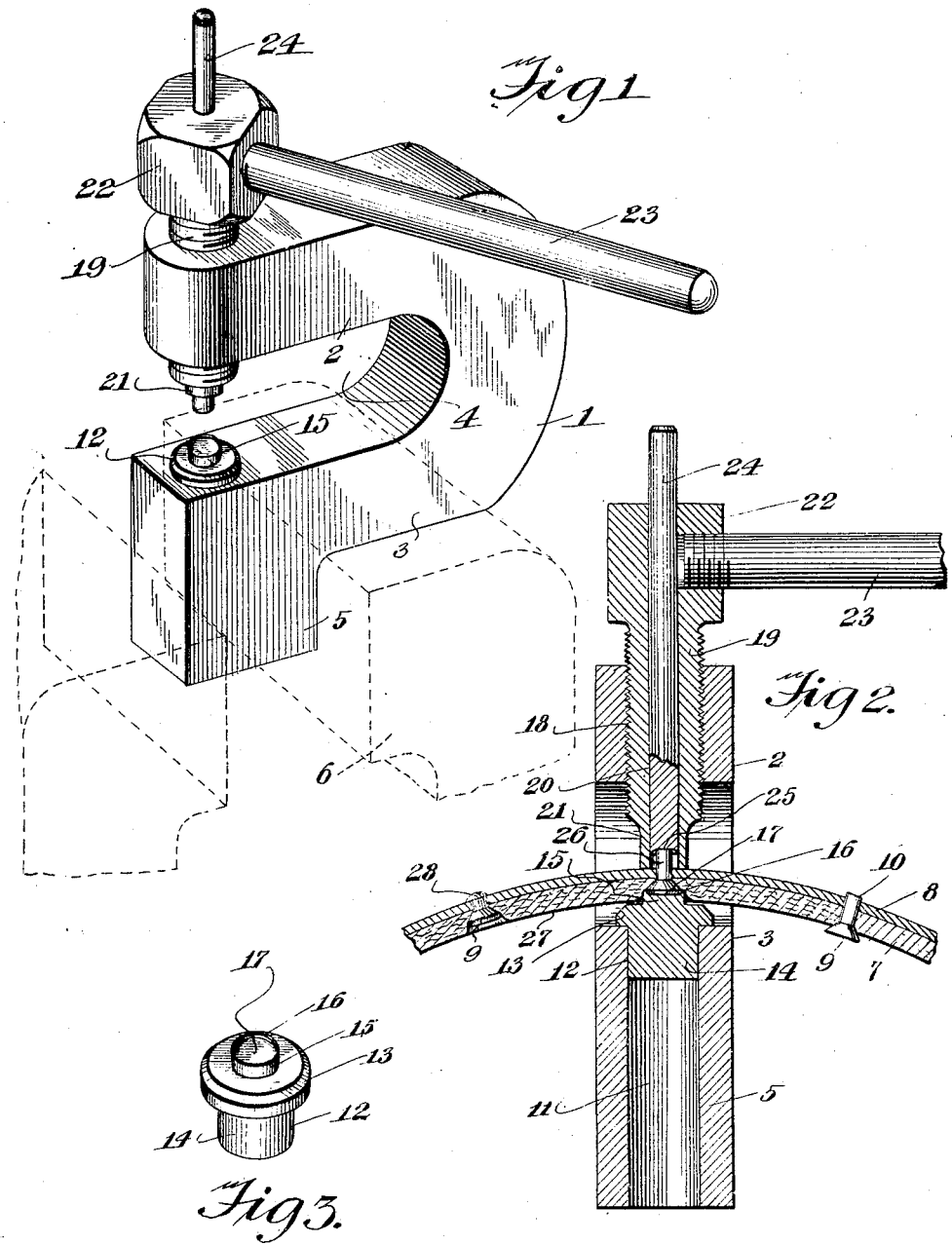

ORVILLE E. HOUSER, OF CHILLICOTHE, OHIO.

RIVETING-MACHINE.

1,373,427.      Specification of Letters Patent.      Patented Apr. 5, 1921.

Application filed May 24, 1920. Serial No. 383,656.

*To all whom it may concern:*

Be it known that I, ORVILLE E. HOUSER, a citizen of the United States, residing at Chillicothe, in the county of Ross and State of Ohio, have invented certain new and useful Improvements in Riveting-Machines, of which the following is a specification.

This invention relates to improvements in riveting machines, and has for its primary object to provide a practical, simple and efficient tool for quickly and securely riveting metallic and fabric layers together. In way of introduction, it may be stated that garages and like establishments are frequently called upon to re-line automobile brake bands, and in the performance of this work it is necessary to rivet the renewed linings to the metallic brake bands. Owing to the resiliency of the fabric lining it has, heretofore, been a difficult matter to embed the heads of the rivets in the fabric linings, in order that such heads could be so positioned as to be free from engagement with the brake drums when the linings were brought into engagement therewith. The present invention, therefore, consists in the provision of a tool which is of such construction that this riveting action may be effected in such an improved and efficient manner that the heads of the rivets will be appreciably embedded in the fabric linings, and to such extent that when the linings are in actual use, the application of pressure thereto will not cause the heads of the rivets to engage with the brake drums, thus providing a lining which may be effectively employed for considerable periods of use without being retarded in efficiency by the engagement of rivet heads with the brake drums.

The invention consists primarily in the provision of a riveting tool which is formed to embody a U shaped member capable of receiving between the fixed arms thereof a brake band and its associated lining, the lower of said arms being provided with a removable die head which is so shaped as to receive the head of a rivet passing through the lining and the brake band, the opposite arm of the tool being provided with an adjustable and tubular pressure member situated in vertical alinement with the die head and capable of having its positions vertically adjusted, whereby upon the lowering of the pressure member the same may be forced into engagement with the brake band so as to permit the upper portion of the die head to be embedded in said lining and to provide a rigid base for the reception of the rivet head, the shank of the rivet projecting upwardly into the tubular pressure member, and the pressure exercised by said member may be of such character as to cause the rivet head to be deeply and firmly embedded within the brake lining, the parts being of such construction that when so positioned a plunger may be inserted within the tubular pressure member and into engagement with the rivet shank, whereby upon the hammering or pounding of the plunger, the shank portion of said rivet may be suitably headed to retain the rivet in positive holding engagement with the lining and brake band.

For a further understanding of the invention, reference is to be had to the following description and to the accompanying drawing, in which similar characters of reference denote like and corresponding parts throughout the several views thereof:

In said drawing:

Figure 1 is a perspective view of the improved riveting tool comprising the present invention.

Fig. 2 is a transverse vertical sectional view thereof, and,

Fig. 3 is a detailed perspective view of the die head.

Referring more particularly to the drawing, it will be observed that the present invention comprises a main frame 1. This frame is of substantially U shaped construction and embodies spaced upper and lower arms 2 and 3 respectively. Preferably, the frame is formed from relatively heavy metal, so that the arms 2 and 3 will be of an extremely rigid character. Also, by the U shaped formation of the frame, a work receiving slot 4 is provided between the arms 2 and 3 thereof and the said slot permitting of the adjustment of the work within the tool to be readily accomplished. Also, the lower arm 3 is provided with an extension 5, by the provision of this extension the tool may be supported firmly within a vise or the like 6, and to thereby permit of the convenient operation of its movable parts. The tool may be employed in many different capacities, but as above stated, the same is primarily used in garage work for the purpose of riveting the flexible lining 7 to the metallic brake bands 8 of the brake mechanism of a motor vehicle. Heretofore, tools employed in this capacity have simply forced the heads 9 of the rivets 10 into the inner face of the lining to such extent that said heads have been substantially or practically flush with said inner surface. Hence, when the linings were in actual use, the same could not exercise their maximum, braking efficiency owing to the fact that the heads 10 would engage the metallic surface of the brake drums with which the linings are employed. Hence, after a very slight amount of wear upon the braking surfaces of the linings, the effect of the latter was greatly minimized, thus requiring continued replacements and loss in the braking efficiency.

To overcome this condition, the tool 1 is so constructed as to provide means for deeply embedding the rivets in the linings in such manner that the heads of such rivets will be appreciably within the braking surface of the linings, thus enabling the latter to operate with all due efficiency without being retarded by the action of the rivet heads. To this end, the lower arm 3 is provided with a vertical bore 11, which is arranged to receive at its upper end a removable die head 12. This head is preferably formed from suitably hardened metal and comprises an enlarged collar 13, which is arranged to rest upon the upper surface of the arm 3. By this construction the die head may be suitably supported in connection with the arm 3, and yet is capable of being readily removed from such applied positions to permit other die heads of varying proportions to be substituted in lieu thereof. The collar 13 terminates downwardly in an extension 14, which is arranged to be seated within the bore 11, a feature which permits the die head to be firmly and positively positioned within the frame of the tool without permitting loss of adjustment thereof. The upper surface of the die head is provided with a boss 15 which is of appreciably smaller diameter than the collar 13 and is provided with a circular cutting edge 16 and with a rivet head receiving and forming depression 17.

In vertical alinement with the bore 15, the upper arm 2 is provided with a threaded bore 18, in which is vertically adjustable a pressure member or screw 19. This screw is provided with a central bore 20 and with a reduced lower end 21, also, the upper end of the screw is enlarged to provide a head 22 in which is threadedly received a laterally extending actuating arm 23. A plunger 24 of greater length than the screw 19 is slidably positioned within the bore 20 and is provided with a concaved lower end 25, the latter being situated to engage with the upper end of a rivet shank 26.

In operation, the brake lining 7 and its associated band 8 is inserted within the slot 4 of the frame 1. To then produce a formed rivet, as shown to the left of Fig. 2, the rivet to be pressed is so positioned that its head will be received within the depression 17 provided in the die head 12. Then, by turning the screw 19, the lower end 21 thereof will be brought to bear upon the upper side of the lining 7. The continued application of pressure to the band results in forcing the rivet head into the metal forming the lining 27 so that the rivet head will be positioned a considerable distance within said lining, or in other words, the rivet head will be counter-sunk and spaced from the braking surface 27 of the lining 7. During this operation the cutting edge of the boss 15 will remove surplus portions of the rivet head, and will cause the latter to be rounded and shaped in the manner conforming to the construction of the depression 17, thereby finishing the rivet head. The next step in operation is to position the plunger 24 within the vertical bore 20 provided in the screw 9, until the lower end of the plunger is in engagement with the shank of the rivet. Then by pounding upon the upper end of the plunger, sufficient pressure will be imparted to the rivet shank to turn the latter downward to produce the head 28, and the curvature of the latter will be governed by the formation of the depression provided in the lower end of the plunger. It will also be observed that a substantial and non-yielding space is provided for the plunger 24 when the latter is being operated to produce the head 28, a feature which enables the head to be produced in such manner that after the removal of the brake band from the tool, the rivets will still maintain their counter-sunk positions within the lining 7.

From the foregoing description, taken in conjunction with the accompanying drawing, it will be apparent that a tool of considerable utility is provided for the purpose set forth, and one which may be used to considerable advantage in machine and garage establishments. It will be noted that the slot 4 is of sufficient depth to permit of considerable lateral adjustment on the part of the brake band, thus permitting the tool to handle brake bands of extended width. Also, the heads 12 are removable, a feature which permits of die heads of varying proportions to be used, so that the tool may be accommodated to rivets of varying proportions. Upon reference to Fig. 2, it will be observed that the lower ends of the rivets are deeply embedded in the brake lining and that the same are appreciably spaced from the braking surface of such lining, therefore the latter may be employed for extended periods of service and may be substantially worn out before the heads of the rivets begin to interfere with the braking efficiency of such linings by engaging with brake drums.

What is claimed is:

1. A riveting tool comprising a substantially U shaped frame having a pair of spaced upper and lower arms, a die head carried by the lower of said arms, said head being provided with a rivet forming extension capable of receiving and shaping the head of a rivet, a screw adjustably carried by the upper arm and situated in vertical alinement with said die head, said screw being capable of pressing work into clamped engagement between its lower end and said die head, and to cause the extension of said die head to be embedded in such work, and a plunger slidably mounted in a bore provided in said screw and capable of engaging rivet shanks projecting from said work.

2. A riveting tool comprising a main frame having a work receiving slot formed therein, a die head carried by the lower wall of said slot, said head being provided with a rivet head engaging projection, a screw carried by said frame and situated above and in vertical alinement with said die head, said screw operating to clamp work between the lower end thereof and said head and to cause the extension of said head to be projected into rivet countersinking engagement with said work, and a plunger slidably mounted within a bore formed axially within said screw.

3. A riveting tool comprising a main frame having a work receiving opening formed therein, a die head removably carried by the lower wall of said opening, said head being formed with a rivet head engaging extension having a circular cutting surface and a depressed interior, a screw adjustably mounted within said frame and located above and in vertical registration with said die head, said screw serving to permit of the clamped engagement of work between the lower end thereof and said head extension, and a slipping plunger mounted axially within said screw and capable of engaging the shanks of rivets projecting from said work.

In testimony whereof I affix my signature.

ORVILLE E. HOUSER.